UNITED STATES PATENT OFFICE.

EUGENE ERLE BATTELLE, OF WAILUKU, TERRITORY OF HAWAII.

PROCESS FOR RECOVERY OF CANE-SUGAR.

1,044,004.

No Drawing.

Specification of Letters Patent. Patented Nov. 12, 1912.

Application filed June 16, 1910. Serial No. 567,191.

*To all whom it may concern:*

Be it known that I, EUGENE ERLE BATTELLE, a citizen of the United States, residing at Wailuku, county of Maui, Territory of Hawaii, have invented certain new and useful Improvements in Processes for Recovery of Cane-Sugar; and I do hereby declare the following to be a full, clear, and exact description of the invention, such as will enable others skilled in the art to which it appertains to make and use the same.

My invention relates to processes for the recovery of cane sugar, and particularly to a process for the manufacture of white sugars from juices, syrups, molasses and massecuites containing glucose, known as invert sugar; and has for its objects, the elimination of glucose, the increasing of the purities of all materials, the production of a white table or single grade of marketable raw sugar, and the extracting of a maximum amount of sugar with a minimum loss of the sugar contained in the initial material.

The invention consists in the novel process as hereinafter set forth and claimed.

My process can be carried out in existing sugar factories with economical results. The glucose is eliminated by addition of sufficient oxid of alkaline earths, boiling and filtering, the solution being boiled previous to a treatment with acid, preferably carbonic or sulfurous acid, as hereinafter explained. By the elimination of the glucose, the purities of all materials are increased. A saving of sugar is effected, the recovery of which was heretofore prevented by the presence of large quantities of glucose in the molasses. The production of white refined or a single grade of raw sugar, made possible by my process, effects a saving in equipment, in labor, and in the time required for manufacture, as the remelting, reboiling, redrying and rehandling of several grades of sugar are obviated.

In the ordinary process of manufacture of raw sugar, the cane juice is limed to neutrality, heated to or near the boiling point, filtered either by decantation or other means, the juice concentrated and boiled to grain, the latter operation being repeated until there is no longer a profitable recovery of sugar, and finally the exhausted or waste molasses still containing from 30% to 40% cane sugar is disposed of at little or no profit. All products from juice to exhausted molasses being more or less rich in glucose, increases the number of boilings (grades of sugar) and makes it impossible to recover more sugar from the above mentioned exhausted molasses.

In carrying out my improved process, the raw juice is limed with quick lime, milk of lime, saccharate of lime, or its equivalent of the alkaline earth group, to form 1% to 5% of the weight of the juice. It is then heated to or near the boiling point, either by pumping through a heater, or by other means of attaining this end. No definite amount of alkali can be specified as the percentage of glucose is variable, but sufficient alkalinity is maintained to destroy sufficient glucose, upon boiling the juice, so as to render the process as described commercially or economically operative. After boiling, the hot solution is run into a first carbonation tank, where acid, preferably carbonic acid, is passed through it until the solution filters readily, when the acid is stopped, and the solution is filtered either by decantation or by mechanical means. In the former case the precipitate is filter pressed. The resulting filtered liquid is now sent to a second carbonation tank, where the alkalinity is increased if desired, and carbonic or sulfurous acid passed through the liquid until the solution is almost neutral to litmus paper.

In juices or sugar solutions containing a low percentage of glucose the single carbonation is sufficient, provided that the lime or its substitute in solution is completely, or nearly so, removed by continued carbonic application. In producing white sugar or with a very impure juice of high glucose content where an excessive amount of lime is required to destroy the glucose, it is advisable to introduce raw sugars from other factories into the juice prior to the addition of lime and carbonation. This latter method not only decreases the amount of lime and thereby the cost of production but also increases the quality of the sugar. With impure juices high in glucose and requiring a large amount of lime, it will be profitable to treat same by the well known and generally used defecation process (adding only a sufficient amount of lime to coagulate albuminous matter after boiling, and filter by decantation) prior to the destruction of the glucose as above stated. This method saves in the amount of lime required. In any case the filtered solution is now concentrated to syrup.

The invention so far as above disclosed applies not only to the manufacture of raw sugar, but it may also be employed in connection with the refining processes now in use. Should the raw sugar to be refined contain glucose, the remelt sugars, syrups, molasses or massecuites, may be treated by the above described process to decompose the invert sugar, the latter passing off with the sludge or press-cake as a metallic glucosate.

After evaporating the solution (juices or other sugar house products) by any of the devices now in use to a syrup, the latter is boiled to grain in the vacuum pans, yielding a massecuite of about the same purity as that of the carbonated juice. From this point a white refined article may be made or raw sugars for refiners may be produced. In case of the former, the massecuite is dropped into the mixer and thence directly into the centrifugals, and subsequently is passed through a granulator, producing white sugar. In the latter case, the massecuite would be dropped into the crystallizers where it would remain for 12 to 24 hours, and then be separated in centrifugal machines, yielding a high purity raw sugar and a high purity molasses.

In all succeeding strikes or boilings, syrup or thick juice is used as in the first case only in smaller amounts, the first molasses being boiled in on same at the finish of the strike, to lower the purity of the massecuite to from 70 to 75 purity. No definite proportions of syrup and molasses can be specified owing to the varied purities of either or both of same; but the object is to lower the purity of the massecuite by boiling the first or only molasses produced in on the syrup grain in such proportions as to yield a single grade of massecuite of from 70 to 75 purity after treatment in crystallizers from 12 to 60 hours and the crystals separated from molasses by centrifugals, yielding a sugar of 96 to 97 polarization and molasses of from 50 to 60 purity. The molasses from this or the molasses from the white sugar, after a second boiling, is to be treated by the well known lime separation process as used in the beet sugar industry, thereby making a further recovery of sugar that up to this time has been impossible owing to the glucose in sugar cane products which combine in the cold with the lime and later decompose, thereby decreasing the purity of the sucrose solution produced from the lime-saccharate combination.

Where there are sufficient reducing sugars in the molasses to be treated by the lime-separation process, to produce a low purity saccharate, such molasses should be treated as juice, as hereinbefore explained, prior to said separation process.

As previously intimated, the most important characteristic of the present invention is that it provides for the removal of the glucose from the juice, syrup or other sugar house solution or product which is initially treated, whereby a white sugar of high purity is obtained and likewise a high purity molasses, of which the latter, by reason of its freedom from glucose, is susceptible of a further recovery of sucrose by the well-known lime separation process as employed in the beet sugar industry. These results are absolutely new in the art, so far as I am aware, and my improvements are also accompanied by the great advantage that the destruction (in large part) of the glucose can be carried out quickly and economically. In order to throw down the glucose the lime must obviously be added to the solution in excess and samples of the solution must first be tested with different quantities of lime until the desired results are obtained. The application of the high temperature specified then causes the rapid formation of the precipitate, which is then removed together with the excess of lime, the latter being first thrown down as a carbonate by the application of carbonic acid as above described. Inasmuch as the solution is maintained in a non-acid state, there is no further inversion of sugar at any stage in the process.

My invention has numerous advantages over the ordinary carbonatation process as used for the recovery of cane sugar in some few instances, in that the large amount of lime, in connection with the high temperatures, eliminates the waxes, gums, pectine and most of the coloring matter, whereby a much lighter colored juice with very little viscosity is obtained. This juice can be easily and freely boiled, and cured in the centrifugals with little water to a white color-free sugar such as it is impossible to obtain with the present carbonatation process.

The term "solution" is used in the claims in a broad sense, as denoting a juice, syrup or other sugar house product. Of course, it will be understood that while the well-known lime separation (Steffens) process, as carried out in the beet sugar industry, is preferable for the recovery of sucrose from the purified molasses, other lime treatments may be used with success.

I claim:

1. A process for the recovery of cane sugar, which comprises adding to a cane sugar solution an oxid of alkaline earth in sufficient quantity to practically eliminate the glucose on the application of approximately boiling heat, heating the solution to approximately the boiling point while in a non-acid state, treating the solution with a suitable acid to remove the excess of lime, and then filtering; substantially as described.

2. A process for the recovery of cane sugar, which comprises the addition to a cane sugar solution of an oxid of alkaline earth, in sufficient quantity to destroy the greater part of the glucose on the application of approximately boiling heat, heating the solution to the aforesaid extent, until the glucose is thrown down as precipitate or decompose, and then passing carbonic acid through the solution; substantially as described.

3. A process for the recovery of cane sugar, which comprises adding lime in excess to a cane sugar solution, then heating the solution to an approximately boiling temperature, while in a non-acid state, and for a sufficient length of time to precipitate or destroy the greater part of the glucose, then removing the excess of lime, and finally filtering the solution; substantially as described.

4. A process for the recovery of cane sugar, which comprises the addition to a cane sugar solution of lime or its equivalent, in a proportion of from 1% to 5% of the weight of the solution, depending on the glucose content of the latter, then heating the solution to approximately the boiling point while in a non-acid condition, until the glucose is thrown down as a lime-glucose or similar precipitate, then passing carbonic acid through the solution to remove the excess of lime, and finally filtering the solution; substantially as described.

5. A process for the recovery of cane sugar, which comprises the elimination of the glucose in the juice or other sugar house product by the addition of an excess of lime to the latter, and the application of approximately boiling heat, recovering crystallized sugar from the purified solution, and a molasses substantially freed from glucose, and then effecting a further recovery of sugar from the molasses by a lime separation process; substantially as described.

6. A process for the recovery of cane sugar, which consists in the preliminary treatment of a cane sugar solution to eliminate the greater part of the glucose, boiling the purified solution to grain and thereby recovering a white sugar and a molasses largely freed from glucose, and then effecting a further recovery of sugar from the molasses by subjecting the latter to a lime separation treatment; substantially as described.

7. A process for the recovery of cane sugar, which comprises the elimination of the glucose in a cane sugar solution by the addition of lime in excess and the application of an approximately boiling temperature, while the solution is in a non-acid state, removing the excess of lime by carbonic acid, filtering, then boiling the juice to grain and thereby obtaining a high purity sugar and a high purity molasses, and finally effecting a further recovery of sucrose from the molasses by treatment with lime; substantially as described.

8. A process for the recovery of cane sugar, which comprises, first, the addition to the cane juice of a quantity of raw sugar, then adding lime to the solution in excess and heating the solution to approximately the boiling point until the greater part of the glucose is thrown down as precipitate, or destroyed, then removing the excess of lime with carbonic acid, and finally filtering the solution; substantially as described.

In testimony whereof I affix my signature, in presence of two witnesses.

EUGENE ERLE BATTELLE.

Witnesses:
H. B. PENHARLOW,
W. LESLIE WEST.